United States Patent
Nosaka (10) Patent No.: US 6,848,262 B2
(45) Date of Patent: Feb. 1, 2005

(54) COMPRESSOR DEVICE AND CONTROL METHOD FOR THE SAME

(75) Inventor: Michiyasu Nosaka, Anjo (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 10/453,925

(22) Filed: Jun. 4, 2003

(65) Prior Publication Data
US 2003/0226368 A1 Dec. 11, 2003

(30) Foreign Application Priority Data

Jun. 5, 2002 (JP) ........................ 2002-164360
May 28, 2003 (JP) ........................ 2003-151391

(51) Int. Cl.$^7$ ................................ F25B 1/00
(52) U.S. Cl. ................. 62/115; 62/230; 417/222.2
(58) Field of Search .................. 62/133, 158, 230, 62/231, 323.4, 115; 417/222.2, 222.1

(56) References Cited

U.S. PATENT DOCUMENTS

| | | | | |
|---|---|---|---|---|
| 4,848,101 A | * | 7/1989 | Suzuki ..................... 62/228.5 |
| 5,074,123 A | * | 12/1991 | Iida et al. ................. 62/228.5 |
| 5,964,578 A | * | 10/1999 | Suitou et al. ............ 417/222.2 |
| 6,077,047 A | * | 6/2000 | Nagai et al. ............ 417/222.1 |
| 6,200,105 B1 | * | 3/2001 | Kawaguchi et al. ..... 417/222.2 |
| 6,321,545 B1 | * | 11/2001 | Ota et al. ..................... 62/133 |
| 6,358,016 B1 | * | 3/2002 | Hidaka et al. ........... 417/222.2 |
| 6,412,294 B2 | * | 7/2002 | Kimura et al. ............. 62/228.3 |
| 6,425,254 B1 | * | 7/2002 | Ota et al. ..................... 62/133 |
| 6,449,965 B1 | * | 9/2002 | Murao et al. ................ 62/133 |
| 6,481,977 B2 | * | 11/2002 | Mameda et al. ......... 417/222.2 |
| 6,508,071 B2 | | 1/2003 | Ota et al. |
| 6,520,749 B2 | * | 2/2003 | Kimura et al. .......... 417/222.2 |
| 6,546,742 B1 | * | 4/2003 | Ota et al. ..................... 62/133 |

FOREIGN PATENT DOCUMENTS

| EP | 0812987 A2 | | 6/1997 |
|---|---|---|---|
| EP | 1075974 A2 | * | 2/2001 |
| JP | 2001140756 A | * | 5/2001 |

* cited by examiner

Primary Examiner—William E. Tapolcai
Assistant Examiner—Mohammad M. Ali
(74) Attorney, Agent, or Firm—Posz & Bethards, PLC

(57) ABSTRACT

A compressor device for a refrigerant cycle includes a compressor and a control unit. The compressor is provided with a displacement changing mechanism for changing its displacement. The control unit changes a current value supplied to the displacement changing mechanism, thereby relatively changing the displacement of the compressor. In the compressor device, when a rotational speed of a vehicle engine is lower than a predetermined rotational speed, the control unit controls an upper limit of the current value between a first predetermined value and a maximum value. Accordingly, a displacement specification of the compressor device can be normalized for vehicle engines having different power outputs, while engine stall can be prevented.

23 Claims, 9 Drawing Sheets

COMPRESSOR DEVICE AND CONTROL METHOD FOR THE SAME

CROSS-REFERENCE TO RELATED APPLICATION

This application is related to and claims priority from Japanese Patent Applications No. 2002-164360 filed on Jun. 5, 2002, and No. 2003-151391, filed on May 28, 2003, the content of which is hereby incorporated by reference.

BACKGROUND OF THE INVENTION

1. Field of the Invention

The present invention relates to a compressor device and a control method for controlling a compressor driven by a vehicle engine. The present invention is suitably used for a swash-plate displacement-variable compressor provided in a vehicle refrigerant cycle system.

2. Description of Related Art

For example, EP 0812987 (JP-A-9-324752) describes a compressor device for compressing refrigerant in a refrigerant cycle system. The compressor device includes a swash plate compressor, a pressure control valve and a control unit. The swash plate compressor has a swash plate that is provided in a pressure control chamber and is connected to a piston. The pressure control valve adjusts the refrigerant pressure in the pressure control chamber. The control unit controls an electric current supplied to the pressure control valve in accordance with a thermal load of the refrigerant cycle system, thereby changing an open degree of the pressure control valve. The compressor is driven by motive power from a vehicle engine. Then, the open degree of the pressure control valve is changed in accordance with a current value supplied from the control unit to the pressure control valve, so that the refrigerant pressure in the pressure control chamber is adjusted, and a slant angle of the swash plate, that is, a stroke of the piston is changed. Thus, the displacement of the compressor is changed by controlling the opening degree of the pressure control valve.

However, in the compressor device, the displacement of the compressor is increased or decreased in accordance with the thermal load of the refrigerant cycle system. Therefore, in a case where the compressor is driven by a low-output vehicle engine and the vehicle engine is operated with a low power (low torque) such as in idling, when the displacement of the compressor is changed to a maximum side, the operation torque of the compressor may become larger than the engine torque. In this case, operation of the vehicle engine may be stopped due to the operation torque of the compressor.

Further, in the compressor device, the open degree of the pressure control valve (solenoid valve) is also changed by the refrigerant suction pressure of the compressor. Therefore, it is difficult to accurately control the displacement of the compressor by the pressure control valve.

Further, when a compressor with a large displacement is used in a low-power engine, an engine stall may be caused. Therefore, it is necessary to prepare many different compressor specifications with different displacements, for different power engines.

SUMMARY OF THE INVENTION

In view of the above-described problems, it is an object of the present invention to provide a compressor device which can normalize its specification between a low-power engine and a high-power engine while preventing an engine stall.

It is another object of the present invention to provide a control method for controlling the compressor device.

According to the present invention, a compressor device includes a compressor for compressing refrigerant in a refrigerant cycle system by using motive power from a vehicle engine, and a control unit for changing a current value supplied to a displacement changing mechanism of the compressor in accordance with a thermal load of the refrigerant cycle system, and for relatively changing the displacement of the compressor by changing the current value. In the compressor device, the control unit changes the displacement of the compressor such that the displacement of the compressor is increased by increasing the current value toward a maximum current value. In this case, the control unit controls an upper limit of the current value between the maximum current value and a maximum first predetermined value that is set smaller than the maximum current value when a rotational speed of the vehicle engine is lower than a first predetermined rotational speed. Alternatively, in the compressor device, the control unit changes the displacement of the compressor such that the displacement of the compressor is increased by decreasing the current value toward a minimum current value. In this case, the control unit controls a lower limit of the current value between the minimum current value and a minimum first predetermined value that is set larger than the minimum current value when the rotational speed of the vehicle engine is lower than the first predetermined rotational speed.

Accordingly, when the displacement of the compressor is increased in accordance with the thermal load of the refrigerant cycle system, the upper limit of the current value or the lower limit thereof can be restricted, thereby restricting the displacement of the compressor to be lower than its maximum displacement. Therefore, operation torque of the compressor can be reduced, thereby preventing engine stall at low output such as in a case where the rotational speed of the vehicle engine is lower that the predetermined rotational speed.

Preferably, the upper limit of the current value is increased from the maximum first predetermined value to the maximum current value as the rotational speed of the vehicle engine increases from a minimum rotational speed to the first predetermined rotational speed. Similarly, the lower limit of the current value is decreased from the minimum first predetermined value to the minimum value as the rotational speed of the vehicle engine increases from the minimum rotational speed to the first predetermined rotational speed. Therefore, cooling capacity of the refrigerant cycle system can be increased while a stop of the vehicle engine can be prevented.

More preferably, the control unit controls the upper limit of the current value between the maximum current value and a maximum second predetermined value that is set smaller than the maximum current value when the rotational speed of the vehicle engine is higher than a second predetermined rotational speed that is higher than the first predetermined rotational speed. Similarly, the control unit controls the lower limit of the current value between the minimum current value and a minimum second predetermined current value that is set larger than the minimum current value when the rotational speed of the vehicle engine is higher than the second predetermined rotational speed.

Further, in the present invention, a pressure control valve of the compressor is controlled based on the current value supplied to the pressure control valve and a pressure difference at least between two different positions at a discharge side of the compressor. In this case, the displacement of the compressor can be accurately controlled without being affected by a suction pressure of the compressor.

BRIEF DESCRIPTION OF THE DRAWINGS

Additional objects and advantages of the present invention will be more readily apparent from the following detailed description of preferred embodiments when taken together with the accompanying drawings, in which:

FIG. 4A is a graph showing a relationship between a displacement of a compressor and a current value Cv applied to the compressor device.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
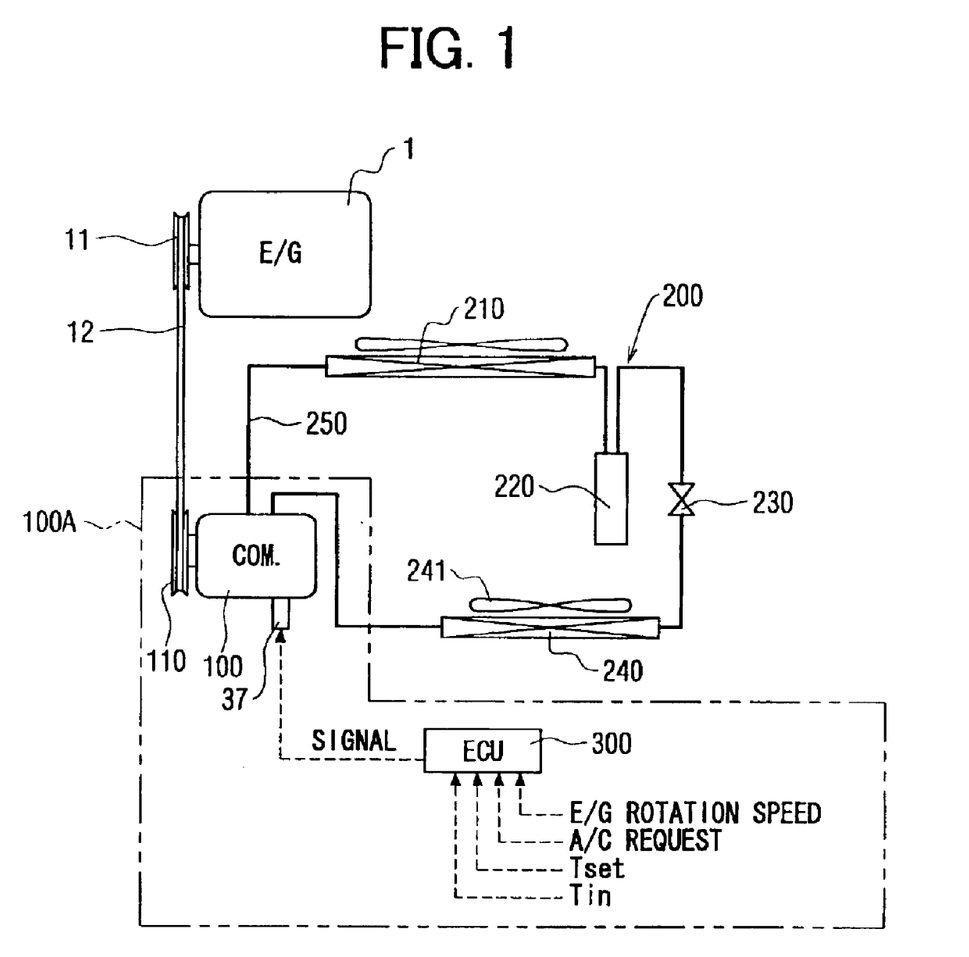
FIG. 1 is a schematic diagram showing a refrigerant cycle system including a compressor device according to preferred embodiments of the present invention.

The first embodiment of the present invention will be now described with reference to FIGS. 1–6. As shown in FIG. 1, a compressor device 100A of the first embodiment includes a compressor 100 and a control unit (ECU) 300. The compressor 100 is provided in a refrigerant cycle system 200 of a vehicle. Further, the compressor 100 is operated by motive power from a vehicle engine (E/G) 1A, and compresses refrigerant in the refrigerant cycle system 200 to a high temperature and high pressure. The refrigerant cycle system 200 includes the compressor 100, a condenser 210, a receiver 220, an expansion valve 230 and an evaporator 240 which are connected by refrigerant piping 250 in this order. The condenser 210 cools and condenses refrigerant compressed by the compressor 100, and the receiver 220 separates the condensed refrigerant from the condenser 210 into gas refrigerant and liquid refrigerant. The expansion valve 230 adiabatically expands and decompresses the liquid refrigerant flowing out from the receiver 220. The refrigerant from the expansion valve 230 is evaporated in the evaporator 240, so that air blown by a blower fan 241 is cooled in the evaporator 240 by using its evaporation latent heat.

Figure 2:
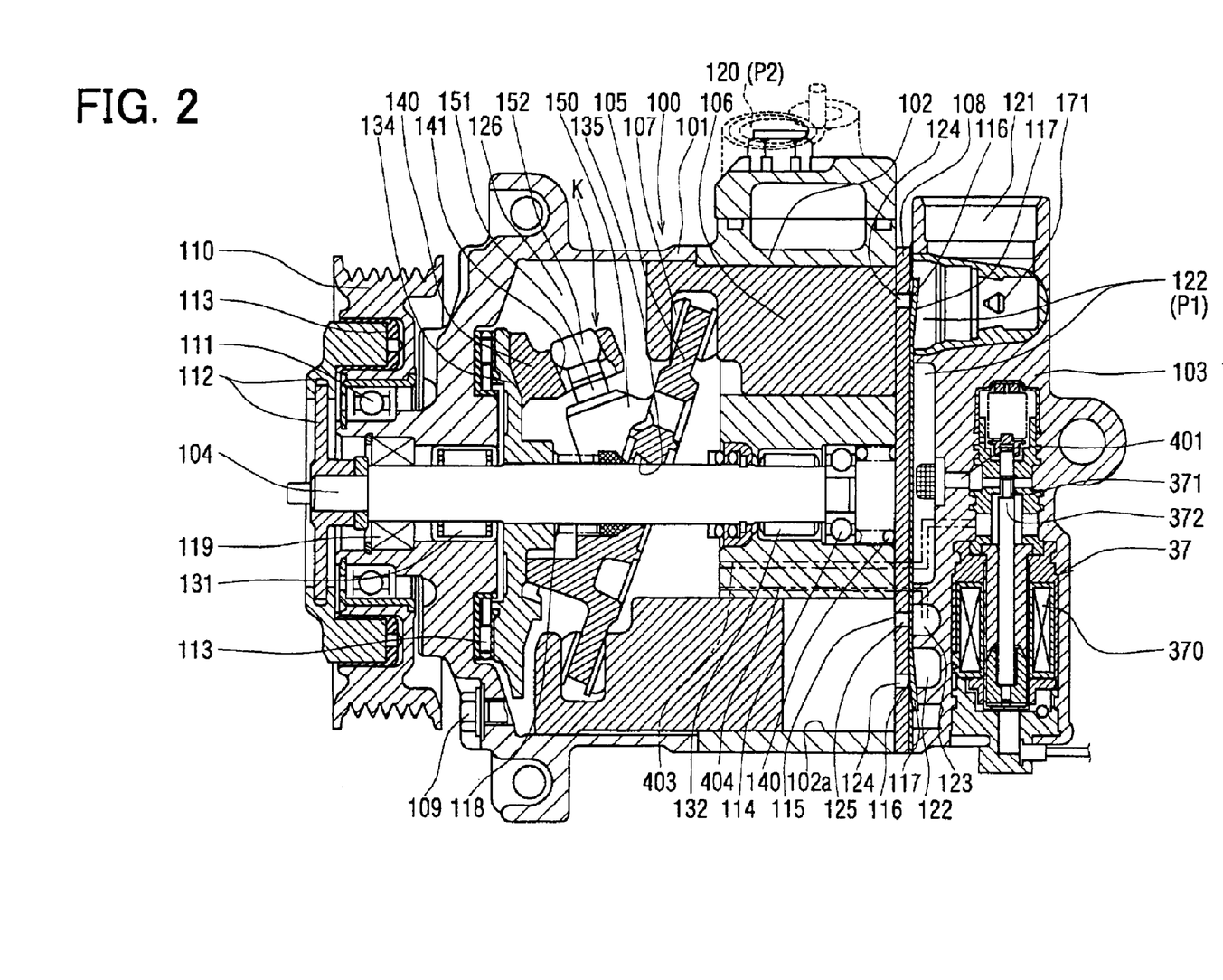
FIG. 2 is a cross-sectional view showing the compressor device in FIG. 1.

As shown in FIG. 2, the compressor 100 is a swash-plate displacement-variable compressor capable of changing its displacement per its rotation by using the control unit 300 shown in FIG. 1. A middle housing 102 having plural cylinder bores 102a is connected to a rear end of a front housing 101, and a rear housing 103 is connected to a rear end of the middle housing 102 through a valve plate 108. These housings 101–103 are fixed together by through bolts 109. A shaft 104, extending in an axial direction of the compressor 100, is received in a swash plate chamber 126 that is formed by the front housing 101 and the middle housing 102. Further, the shaft 104 is rotatably supported by needle bearings 131, 132, and a clearance between the shaft 104 and the front housing 101 is sealed by a shaft seal 119.

A pulley 110 is rotatably supported by a pulley bearing 111 fixed to the front housing 101, and is coupled to a hub 112 through a rubber pad 113. Here, the hub 112 is fixed to the shaft 104. As shown in FIG. 1, the pulley 110 is connected to a crank pulley 11 of the engine 1 through a belt 12, and is rotated by using motive power from the engine 1, thereby rotating the shaft 104. The plural bores 102a are provided in the middle housing 102 around the shaft 104, and pistons 106 are fitted in the plural bores 102a, respectively. A rotor 134 is fixed to the shaft 104 in the swash plate chamber 126, and is capable of rotating together with the shaft 104 through a thrust bearing 113 that is provided between the rotor 134 and the front housing 101. A swash plate 105, having a guide hole 135 in which the shaft 104 penetrates, is provided at a rear side of the rotor 134. The swash plate 105 constitutes a displacement changing mechanism of the compressor 100. The guide hole 135 is formed so that the swash plate 105 can be slanted to a maximum slant state shown in FIG. 2 from a vertical state with respect to the shaft 104.

Thrust bearings 113, 114 and a spring 140 are provided to support the load of the shaft 104 in its axial direction, and a spring 118 is provided between the rotor 134 and the swash plate 105 in order to accurately set the swash plate 105. Each of plural shoes 107 used as a connecting mechanism has a spherical shape, and is contacted to an outer periphery of the swash plate 105. An outer peripheral surface of each shoe 107 is engaged with a sphere removable-supporting surface of each piston 106. In this way, each piston 106 is connected to the swash plate 105 through the shoes 7, and is received in each cylinder bore 102a in capable of reciprocating therein.

A pair of brackets 150, for forming a hinge mechanism K, protrudes forward from the swash plate 105 so as to pinch the shaft 104. Each bracket 150 is fixed to one end of a guide pin 151, and a spherical portion 152 is fixed to the other end of the guide pin 151. A pair of supporting arms 140 protrudes backward from the rotor 134 so as to face the guide pins 151. The supporting arm 140 has an arm hole 341 at its top end side, and the spherical portion 152 of the guide pin 151 is inserted into the arm hole 141 in capable of rotating and sliding. The guide pin 151 rotates and slides in the arm hole 141, thereby changing a slant angle of the swash plate 105 with respect to the shaft 104.

The rear housing 103 has a suction chamber 123 and a discharge chamber 122. The valve plate 108 has suction holes 125 and discharge holes 124 which are provided to correspond to the bores 102a, respectively. A compressing chamber is formed between the valve plate 108 and each piston 106, and communicates with the suction chamber 123 and the discharge chamber 122 through the suction holes 125 and the discharge holes 124, respectively. A suction valve 115 is disposed to open and close each suction hole 125 in accordance with reciprocation of each piston 106, and is provided on each suction hole 125. A discharge valve 116 is disposed to open and close each discharge hole 124 in accordance with reciprocation of each piston 106 while being restricted by a valve stopping plate 117. Further, the rear housing 103 has a suction port 121, and the suction chamber 123 is coupled to the evaporator 240 in the refrigerant cycle system 200. Similarly, the middle housing 102 has a discharge port 120, and the discharge chamber 122 is coupled to the condenser 210 in the refrigerant cycle system 200.

A pressure control valve 37, for adjusting a refrigerant pressure in the swash plate chamber 126, is disposed in the rear housing 103. The pressure control valve 37 constructs a displacement changing mechanism together with the swash plate 105, and has a valve body 372 therein. When an electric current is supplied to a coil 370, the valve body 37 slides in its longitudinal direction, and opens and closes an opening 371. Here, as the current value Cv supplied to the coil 370 becomes larger, the valve body 372 slides in a direction where the opening 371 is closed.

In the compressor 100 shown in FIG. 2, a shutting valve 171 is disposed in a refrigerant passage provided between the discharge port 120 and the discharge chamber 122. The shutting valve 171 stops refrigerant circulation by closing the refrigerant passage between the discharge port 120 and the discharge chamber 122 when refrigerant pressure in the discharge chamber 122 becomes lower than a predetermined pressure. The shutting valve 171 may be a differential pressure regulating valve or a solenoid valve. The differential pressure regulating valve 171 mechanically detects a pressure difference between its front and rear sides in the refrigerant passage, and is operated based on the detected pressure difference. The solenoid valve is operated by the control unit 300 based on a pressure difference between its front and rear sides, detected by a discharge pressure sensor (not shown). Further, the shutting valve 171 may be mechanically linked to the swash plate 105. In this case, the shutting valve 171 shuts the passage when the slant angle of the swash plate 5 is minimum.

Figure 3:
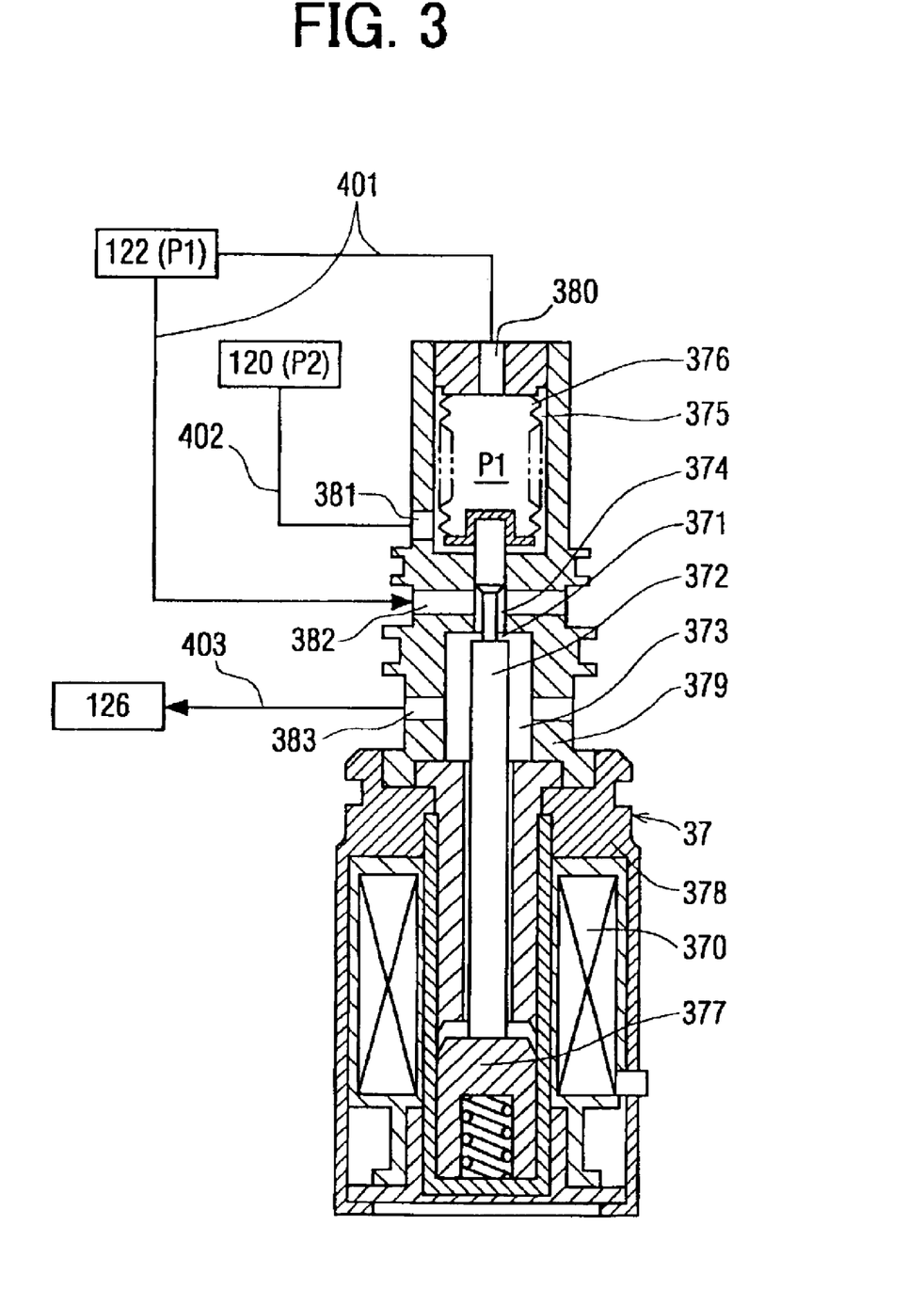
FIG. 3 is a schematic diagram showing a pressure control valve of the compressor device in FIG. 1.

The valve body 372 of the pressure control valve 37 is controlled by using a first pressure P1 in the discharge chamber 122 and a second pressure P2 at the discharge port 120, for example. The second pressure P2 is a pressure in the refrigerant passage at a side of the condenser 31 (downstream side from the discharge chamber 122). There is a relative relationship between a refrigerant flow amount and a differential pressure between the first pressure P1 and the second pressure P2. As shown in FIG. 3, the discharge chamber 122 having the first pressure P1 communicates with the pressure control valve 37 through a communication passage 401. The discharge port 120 having the second pressure P2 communicates with the pressure control valve 37 through a communication passage 402 as shown in FIG. 3. The pressure control valve 37 has a valve chamber 373, a communication hole 374 and a pressure sensing chamber 375. The valve body 372 is disposed to be movable in the valve chamber 373 and the communication hole 374 in an up-down direction in FIG. 3. A top end of the valve body 372 is connected to a pressure sensing body 376 disposed in the pressure sensing chamber 375. The pressure sensing chamber 375 and the communication hole 374 are partitioned from each other by the valve body 372 and a case 379. The communication hole 374 and the valve chamber 373 are partitioned from each other by closing the opening 371.

The first pressure P1 in the discharge chamber 122 is introduced to the pressure sensing body 376 through the communication passage 401. The second pressure P2 in the discharge port 120 is introduced into the pressure sensing chamber 375 through the communication passage 402. The pressure sensing body 376 is disposed in the pressure sensing chamber 375. Further, the first pressure P1 in the discharge chamber 122 is introduced into the communication hole 374 through a pressure hole 382, and is introduced into the swash plate chamber 126 through a pressure hole 383 and a communication passage 403.

When the compressor 100 is operated, and when the current value Cv is supplied to the coil 370 of the pressure control valve 37, a core 377 is attracted to the coil 370, thereby moving the valve body 372. Since the valve body 372 is moved so as to close the opening 371, the first pressure P1 is not introduced from the pressure hole 383 into the swash plate chamber 126. Here, the swash plate chamber 126 communicates with the suction chamber 123 through a communication passage 404. Therefore, when the compressor 100 is operated, the refrigerant pressure in the swash plate chamber 126 is reduced, so that the swash plate 105 is more slanted, and the displacement of the compressor 100 is increased. The differential pressure between the first pressure P1 and the second pressure P2 is increased due to this increase of the displacement. The first pressure P1 is introduced to the pressure sensing body 376, and the second pressure P2 is introduced into the pressure sensing chamber 375, that is, outside the pressure sensing body 376. Therefore, the differential pressure between the pressure inside the pressure sensing body 376 and pressure outside the pressure sensing body 376 is increased, thereby extending the pressure sensing body 376 in its longitudinal direction. Since the pressure sensing body 376 is substantially integrated to the valve body 372, this extending force of the pressure sensing body 376 and the attracting force of the valve body 372 are balanced against each other. In the first embodiment, both the first pressure P1 and the second pressure P2 are discharge-side refrigerant pressures of the compressor 100.

A space (i.e., the valve chamber 373) for receiving the valve body 372 communicates with the swash plate chamber 126 through the communication passage 403. Further, the communication hole 374 facing the valve body 372 communicates with the discharge chamber 122 through the communication passage 401. Therefore, when the opening 371 is opened by the valve body 372, the swash plate chamber 126 communicates with the discharge chamber 122. On the contrary, when the opening 371 is closed by the valve body 372, the communication between the swash plate chamber 126 and the discharge chamber 122 is interrupted. Further, the swash plate chamber 126 and the suction chamber 123 communicate with each other through the communication passage 404. In the first embodiment, the pressure control valve 37 is not controlled by the suction pressure. Accordingly, even if the suction pressure changes due to air temperature increase and the like, the pressure control valve 37 can be controlled regardless of this suction pressure change.

As described above, the space where the valve body 372 is received communicates with the swash plate chamber 126 through the communication passage 403, and the space opposite the valve body 372 communicates with the discharge chamber 122 through the communication passage 401. Therefore, when the opening 371 is opened by the valve body 372, the swash plate chamber 126 communicates with the discharge chamber 122. On the contrary, when the opening 371 is closed by the valve body 372, the communication between the swash plate chamber 126 and the discharge chamber 122 is interrupted. Further, the swash plate chamber 126 communicates with the suction chamber 123 through the communication passage 404.

In FIG. 1, the control unit 300 controls the displacement of the compressor 100. Signals such as a rotational speed R of the engine 1, an air-conditioning request command, a set temperature Tset and an air temperature (inside air temperature) Tin in a passenger compartment are input into the control unit 300. Here, a thermal load of the refrigerant cycle system 200 can be obtained by a temperature difference between the set temperature Tset and the inside air temperature Tin. As this temperature difference between the set temperature Tset and the inside air temperature Tin becomes larger, the thermal load of the refrigerant cycle system 200 becomes larger. When the signal of the air-conditioning request command is input to the control unit 300, the control unit 300 calculates this thermal load, and determines an electric signal amount (current value Cv) in accordance with the calculated thermal load. Then, the control unit 300 supplies the determined current value Cv to the coil 370 of the pressure control valve 37. Further, when the rotational speed R of the engine 1 is equal to or lower than a first predetermined rotational speed A, the control unit 300 controls the upper limit of the current value Cv supplied to the pressure control valve 37 between a first variable maximum value α1% and a maximum value 100%, as described later in detail.

Next, operation of the compressor device 100A will be now described. In the compressor 100, the shaft 104 and the swash plate 105 are rotated by power from the engine 1, and the pistons 106 connected to the swash plate 105 reciprocate in the cylinder bores 102a. Thus, refrigerant is sucked from the suction chamber 123, is compressed and is discharged from the discharge chamber 122.

When the thermal load of the refrigerant cycle system is large, the control unit 300 increases the current value Cv to be supplied to the pressure control valve 37. Then, the valve body 372 slides to reduce an open area of the opening 371. When the open area reduces, a communication degree between the swash plate chamber 126 and the discharge chamber 122 is reduced, thereby reducing discharge pressure of refrigerant to be supplied from the discharge chamber 122 to the swash plate chamber 126. Further, at this time, pressure leaks from the swash plate chamber 126 to the suction chamber 123, thereby reducing the pressure in the swash plate chamber 126. Thus, the swash plate 105 is moved to a large slant-angle side shown in FIG. 2, by a balance between the pressure in the cylinder bores 102a and the pressure in the swash plate chamber 126. Therefore, a stroke of the pistons 106 increases, thereby increasing the displacement of the compressor 100. On the contrary, when the thermal load is small, the control unit 300 reduces the current value Cv to be supplied to the pressure control valve 37, thereby reducing the displacement of the compressor 100.

Figure 4A:
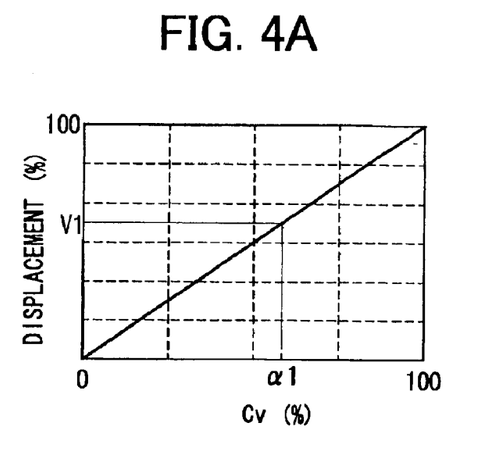
Figure 4B:
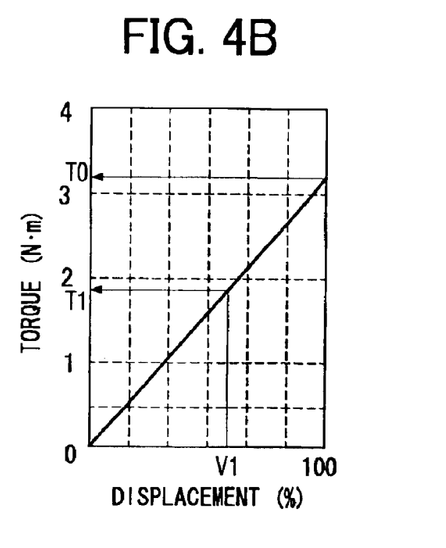
FIG. 4B is graph showing a relationship between an operation torque of the compressor and the displacement of the compressor, according to a first embodiment of the present invention.

As shown in FIG. 4A, as the current value Cv increases, the displacement of the compressor 100 is increased. When the current value Cv is maximum (100%), the displacement of the compressor 100 becomes maximum (100%). Further, as shown in FIG. 4B, as the displacement of the compressor 100 increases, operation torque Top of the compressor 100 is increased.

Figure 5:
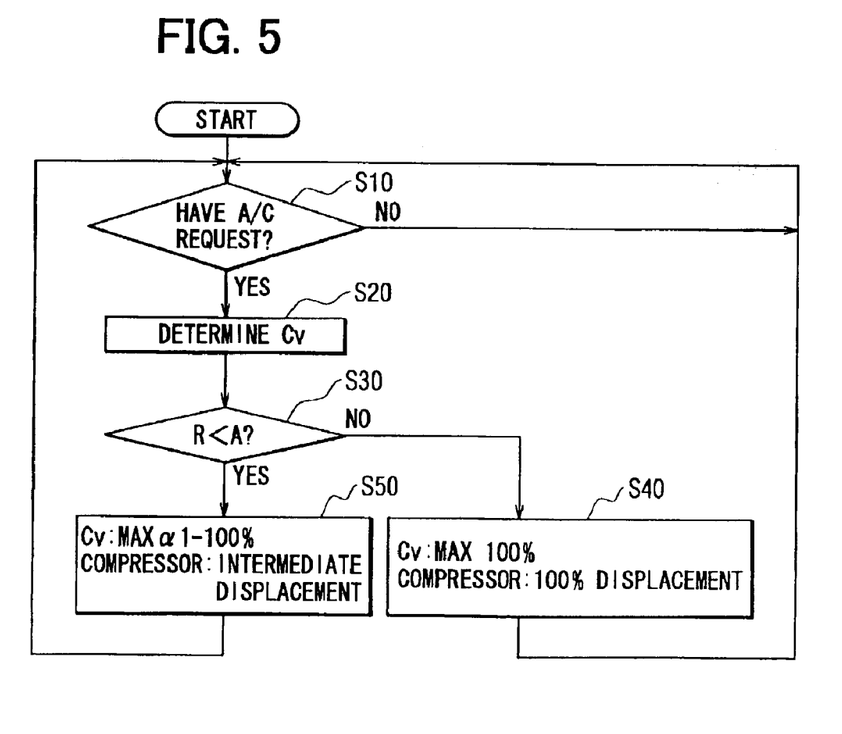
FIG. 5 is a flow diagram showing a control process of the compressor according to the first embodiment.

Hereinafter, a control operation of the control unit 300 for controlling the displacement of the compressor 100 will be described with reference to FIG. 5. First, it is determined based on the air-conditioning command signal whether or not air-conditioning (A/C) operation is demanded at step S10. When an air-conditioning request signal is input to the control unit 300, the control program moves to step S20. At step S20, the thermal load of the refrigerant cycle system 200 is calculated based on the inside air temperature Tin and the set temperature Tset, and the current value Cv corresponding to the calculated thermal load is determined. When the air-conditioning (A/C) request signal is not input to the control unit 300, the control program returns to the start.

Figure 6:
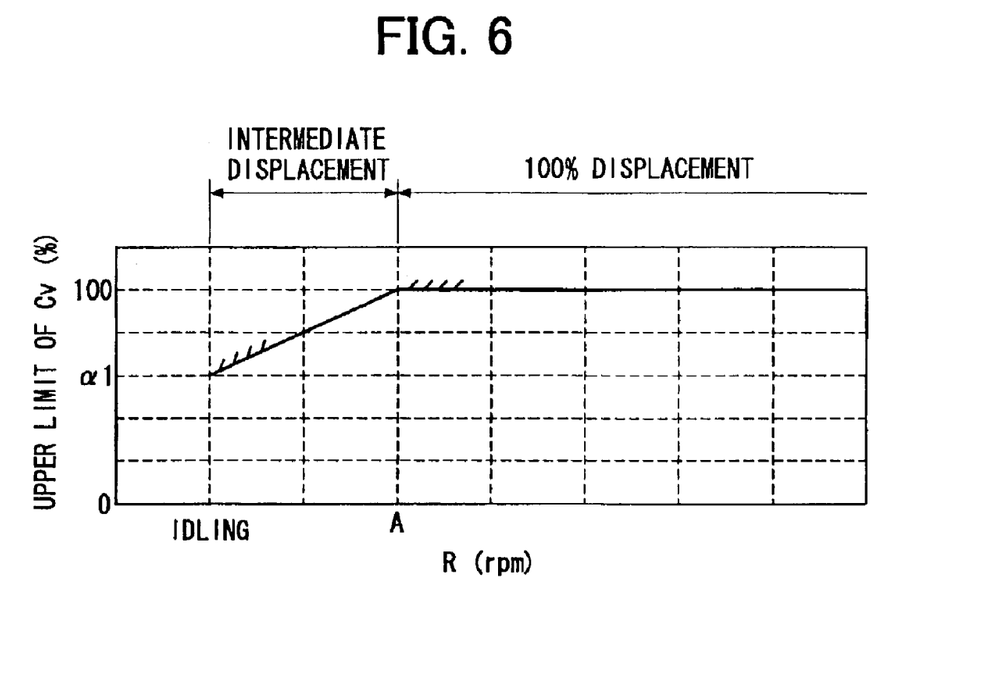
FIG. 6 is a graph showing a relationship between an upper limit of the current value Cv and a rotational speed R of a vehicle engine, according to the first embodiment.

Then, at step S30, it is determined whether or not the rotational speed R of the engine 1 is lower than a first predetermined rotational speed A. The first predetermined rotational speed A is set at a rotational speed R of the engine 1, at which the engine 1 can drive the compressor 100 even when the compressor operates at its maximum displacement. When the determination is "NO" at step S30, that is, when it is determined at step S30 that the rotational speed R of the engine 1 is higher than the first predetermined rotational speed A, 100% displacement operation of the compressor 100 is performed at step S40. Specifically, as shown in FIG. 6, the upper limit of the current value Cv supplied to the pressure control valve 37 is set at maximum 100%, so that the upper limit of the displacement of the compressor 100 is set at maximum 100%.

On the other hand, when the determination is "YES" at step S30, that is, when it is determined at step S30 that the rotational speed R of the engine 1 is lower than the first predetermined rotational speed A, an intermediate displacement operation is performed at step S50. Specifically, as shown in FIG. 6, the upper limit (first upper limit) of the current value Cv is controlled between the first variable maximum value α1% and maximum 100%, so the displacement of the compressor 100 is controlled in this corresponding area. In FIG. 6, the upper limit of the current value Cv is set to the first variable maximum value α1 (%) in an idling rotational speed where the rotational speed R of the engine 1 is minimum. Further, the upper limit of the current value Cv is set at maximum 100% when the rotational speed R of the engine 1 is set at the first predetermined rotational speed A. Here, the upper limit of the current value Cv is linearly changed between α1 (%) and 100 (%).

Since the upper limit of the current value Cv is controlled as described above, an upper limit of the variable displacement is controlled between V1 (%) and 100 (%), as shown in FIG. 4A. That is, the intermediate displacement operation is performed as shown in FIG. 6. At this time, the operation torque Top of the compressor 100 is controlled between T0 and T1, as shown in FIG. 4B. Specifically, when the displacement of the compressor 100 is increased in accordance with the thermal load of the refrigerant cycle system 200, the upper limit of the current value Cv is set. Therefore, the variable displacement of the compressor 100 can be controlled to be smaller than its maximum displacement, and the operation torque Top of the compressor 100 can be reduced, thereby preventing engine stall even when the engine operates with a low output (e.g., the first predetermined rotational speed A or lower).

That is, in the compressor 100 having a maximum displacement adaptable to a high-power engine, a first variable maximum value α1 (%) can be set for each power engine between a low-power vehicle engine and the high-power vehicle engine. Therefore, the same compressor 100 can be used for different-power type engines from the low-power engine to the high-power engine, thereby normalizing the displacement specification of the compressor 100.

Further, in an area higher than the predetermined rotational speed A of the engine 1, sufficient motive power can be obtained from the engine 1. In this case, the upper limit of the current value Cv can be controlled at the maximum value 100 (%), thereby ensuring the maximum displacement, and obtaining sufficient cooling performance in the refrigerant cycle system.

Further, the first variable maximum value α1 (%) is set to be linearly increased from an idling rotational speed where the rotational speed R of the engine 1 is minimum to the predetermined rotational speed A. Therefore, as the rotational speed R approaches the first predetermined rotational speed A, that is, as the motive power from the engine 1 increases, the displacement of the compressor 100 approaches its maximum displacement. Thus, cooling performance can be ensured while the engine 1 can be prevented from being stalled.

Furthermore, in the compressor device 100A having the above-described structure, the relationship between the displacement of the compressor 100 and the current value Cv supplied to the pressure control valve 37 can be accurately determined. Therefore, the displacement of the compressor 100 can be more accurately controlled based on the current value Cv, and the displacement control of the compressor 100 can be more surely realized.

(Second Embodiment)

Figure 7:
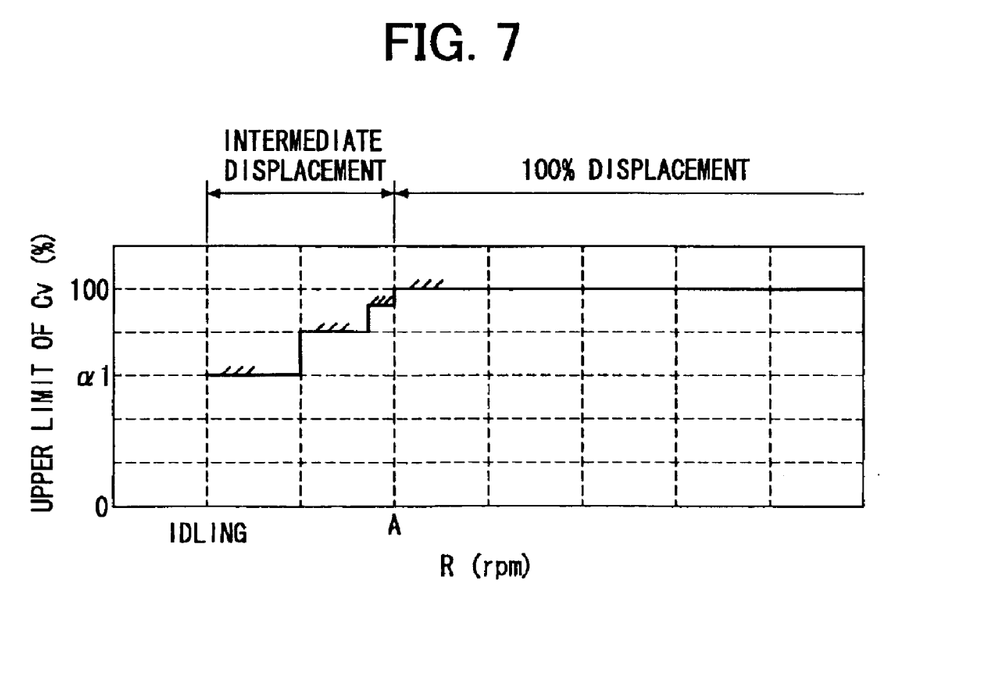
FIG. 7 is a graph showing a relationship between the upper limit of the current value Cv and the rotational speed R of the vehicle engine, according to a second embodiment of the present invention.
Figure 8:
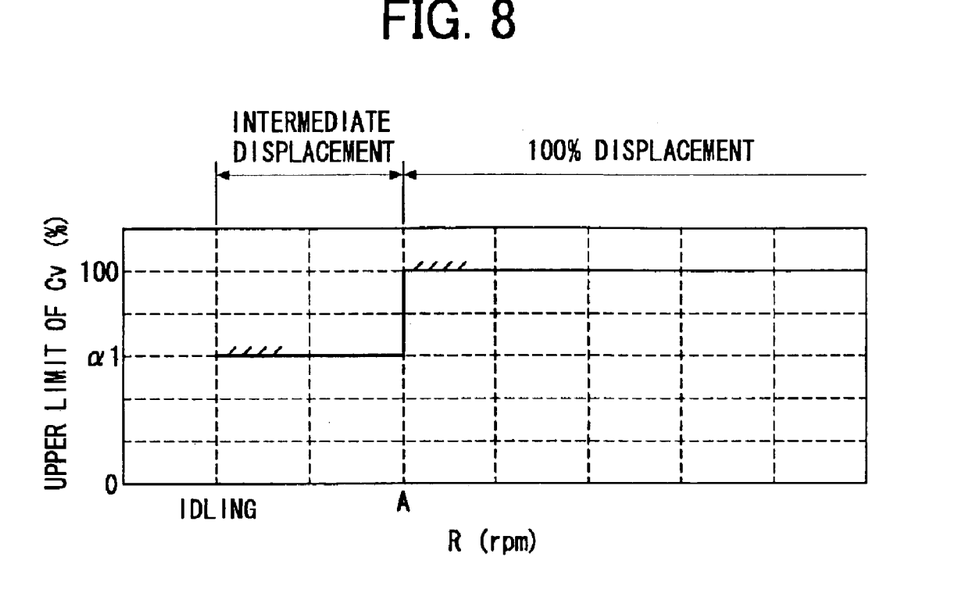
FIG. 8 is a graph showing a relationship between the upper limit of the current value Cv and the rotational speed R of the vehicle engine, according to a modification of the second embodiment.
Figure 9:
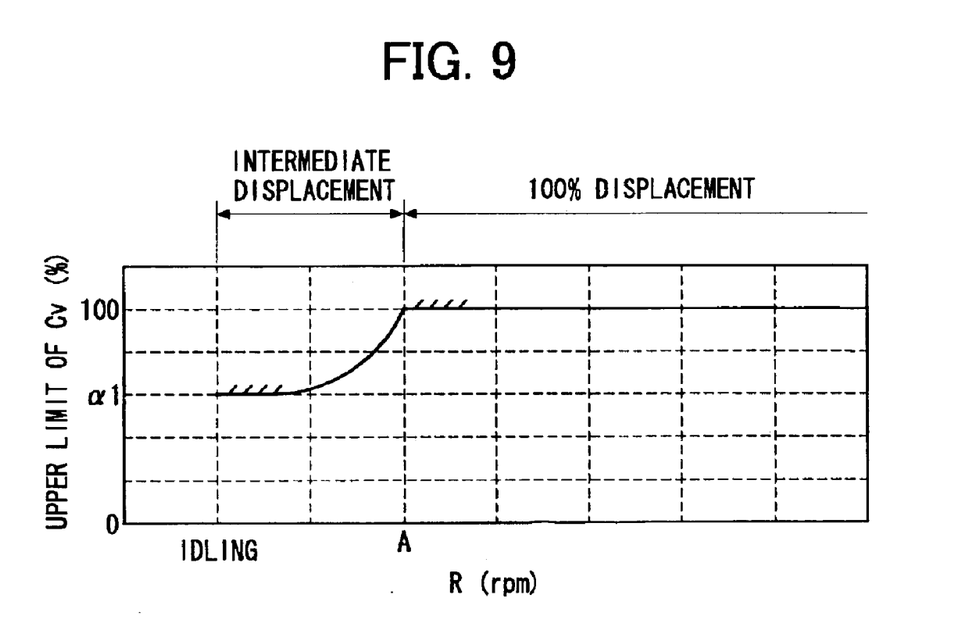
FIG. 9 is a graph showing a relationship between the upper limit of the current value Cv and the rotational speed R of the vehicle engine, according to another modification of the second embodiment.

In the above-described first embodiment of the present invention, the upper limit of the current value Cv is set linearly between $\alpha 1$ (%) and 100 (%) in the rotational speed range of the engine between the idling speed and the predetermined rotational speed A. Similarly, in the second embodiment, the upper limit of the current value Cv is set between $\alpha 1$% and 100% when the rotational speed R of the engine 1 is lower than the predetermined rotational speed A. However, in the second embodiment, the upper limit of the current value Cv is stepwise changed therebetween as shown in FIG. 7, so that the control program shown in FIG. 5 is made simple. Here, in accordance with output characteristics of the engine 1, the upper limit of the current value Cv can be set at a constant value, in the rotational speed range between the idling rotational speed and the predetermined rotational speed A as shown in FIG. 8. For example, the constant value of the upper limit is $\alpha 1$%. Alternately, as shown in FIG. 9, the upper limit of the current value Cv can be set in a curved line in the rotational speed range between the idling rotational speed and the predetermined rotational speed A of the engine 1. In the second embodiment, the other parts are similar to those of the above-described first embodiments, and the advance described in the first embodiment can be obtained.

(Third Embodiment)

The third embodiment of the present invention will be now described with reference to FIGS. 10 and 11.

Figure 10:
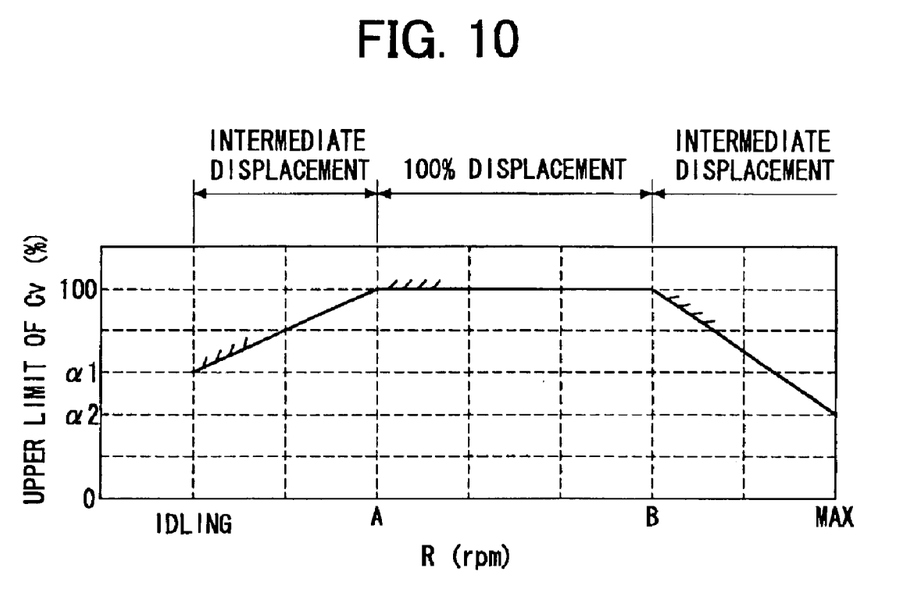
FIG. 10 is a graph showing a relationship between the upper limit of the current value Cv and the rotational speed R of the vehicle engine, according to a third embodiment of the present invention.
Figure 11:
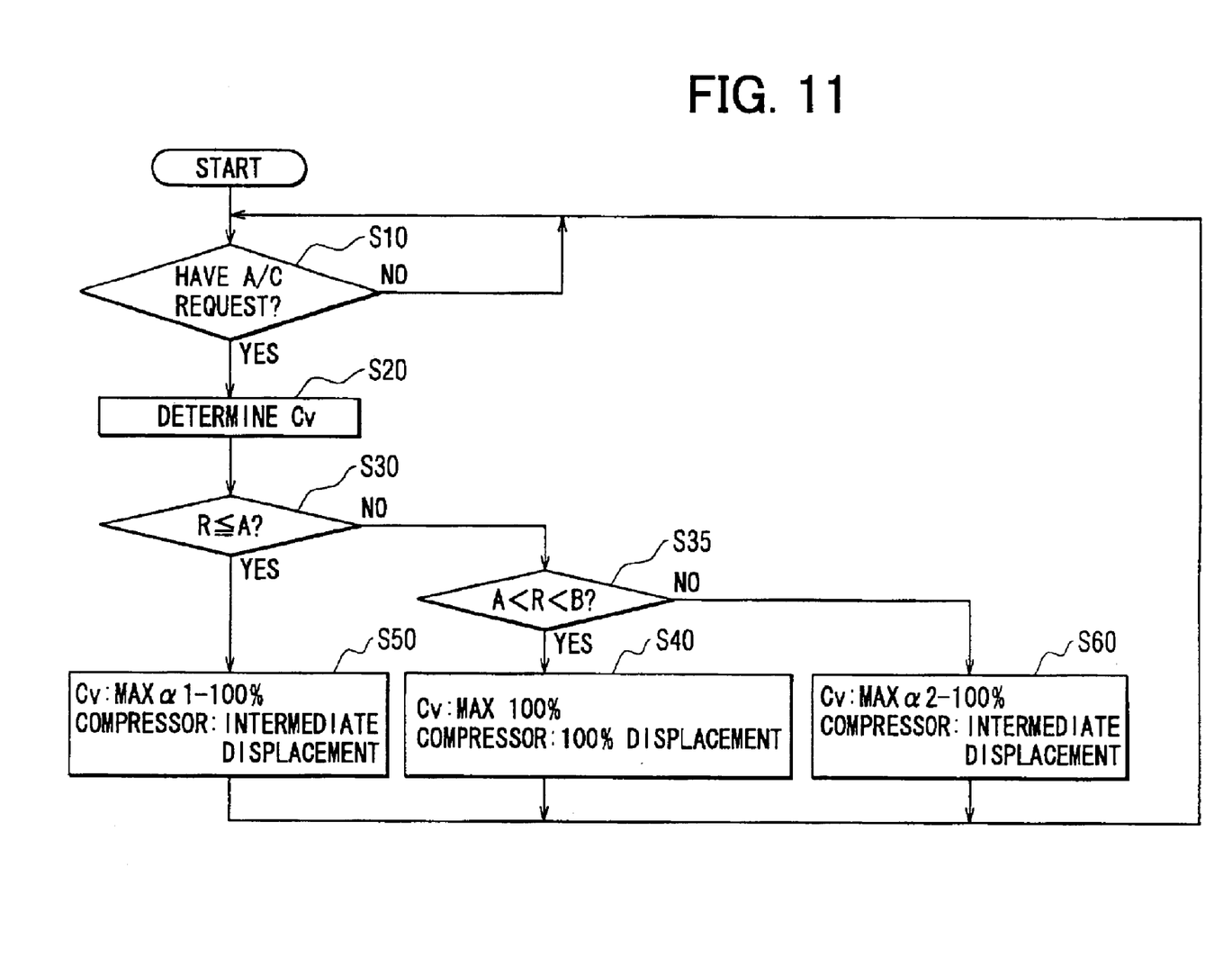
FIG. 11 is a flow diagram showing a control process of the compressor according to the third embodiment.

As shown in FIG. 10, in the third embodiment, a first predetermined rotational speed A similar to the above-described predetermined rotational speed of the first embodiment, and a second predetermined rotational speed B higher than the first predetermined rotational speed A are used. When the rotational speed R of the engine 1 becomes equal to or higher than the second predetermined rotational speed B, the upper limit of the current value Cv is linearly controlled between a second variable maximum value $\alpha 2$ (%) and maximum 100 (%). The second predetermined rotational speed B is set as a threshold for defining a rotational speed area where the rotational speed R of the engine 1 is controlled mainly based on its output power. Specifically, as shown in FIG. 11, the control operation of the control unit 300 is performed for controlling the displacement of the compressor 100. In the third embodiment, step S35 and step S60 are added in FIG. 5 of the above-described first embodiment.

When it is determined at step S30 that the rotational speed R of the engine 1 is higher than the first predetermined rotational speed A, it is determined at step S35 whether or not the rotational speed R is higher than the first predetermined rotational speed A and lower than the second predetermined rotational speed B. When it is determined at step S35 that the rotational speed R is equal to or higher than the second predetermined rotational speed B, that is, when the determination at step S35 is NO, the upper limit of the current value Cv is controlled between $\alpha 2$ (%) and 100 (%), thereby variably controlling the displacement of the compressor 100. When the engine 1 is operated at a high rotational speed, a displacement flow amount (=displacement×rotational speed) of the compressor is increased as the rotational speed R of the engine 1 increases. In this case, cooling performance may be excessively increased. Alternatively, motive power of the engine 1 is reduced by the increased operation torque of the compressor 100, and the motive power of the engine 1 used for a vehicle accelerating performance is reduced.

In a rotational speed range higher than the second predetermined rotational speed B, the upper limit of the current value Cv can be controlled between $\alpha 2$ (%) and 100 (%), thereby restricting the displacement of the compressor 100 to be lower than its maximum displacement. Therefore, the cooling performance of the refrigerant cycle system 200 can be suitably controlled, and the motive power from the engine 1 can be prevented from being greatly reduced due to the operation of the compressor 100. Further, as the rotational speed R of the engine 1 increases higher than the second predetermined rotational speed B, the displacement of the compressor 100 can be reduced lower than its maximum displacement performance. Therefore, the cooling performance of the refrigerant cycle system 200 can be suitably controlled while the motive power obtained from the engine 1 for driving the vehicle can be increased. Also in the rotational speed range higher than the second predetermined rotational speed B shown in FIG. 10, the upper limit of the current value Cv can be controlled in a curved line or stepwise, similarly to above-described second embodiment of the present invention. Further, as shown in FIG. 10, in the rotational speed range between the first predetermined rotational speed A and the second predetermined rotational speed B, the upper limit of the current value Cv can be set at the maximum %.

In the third embodiment, the other parts are similar to those of the above-described first embodiment.

(Fourth Embodiment)

Figure 12:
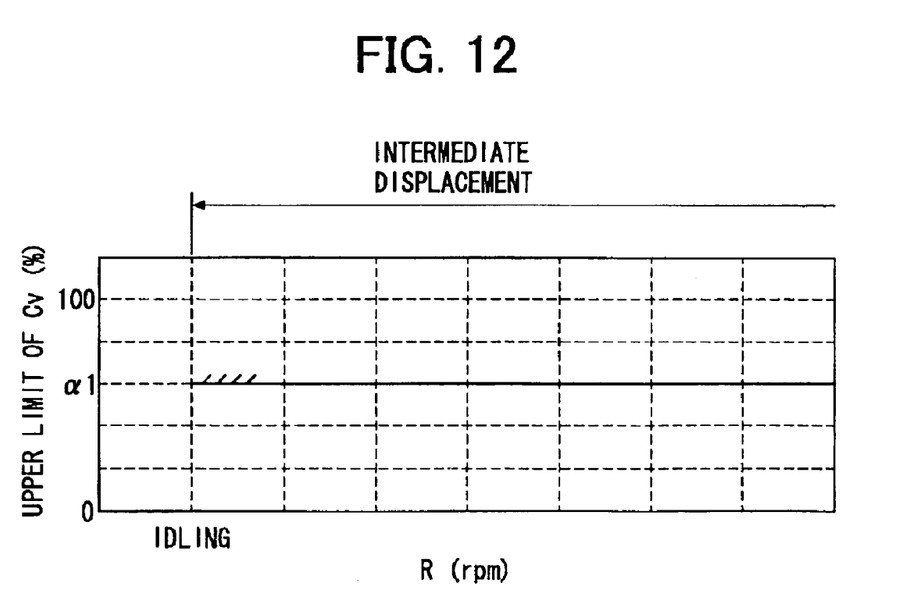
FIG. 12 is a graph showing a relationship between the upper limit of the current value Cv and the rotational speed R of the vehicle engine, according to a fourth embodiment of the present invention.

In the fourth embodiment, as shown in FIG. 12, the upper limit of the current value Cv is controlled at the first variable maximum value $\alpha 1$% that is set lower than 100%, thereby variably controlling the displacement of the compressor 100. Specifically, the maximum displacement of the compressor 100 is controlled to be lower than ($\alpha 1$/100)%. Further, the first variable maximum value $\alpha 1$% can be changed. Therefore, the compressor 100, having large displacement performance, can be used as a compressor having different displacement performance. As a result, the same compressor 100 can be adapted to every power engines from the low-power engine to a high-power engine, thereby normalizing the displacement specification of the compressor 100.

Although the present invention has been fully described in connection with the preferred embodiments thereof with reference to the accompanying drawings, it is to be noted that various changes and modifications will become apparent to those skilled in the art.

Figure 13:
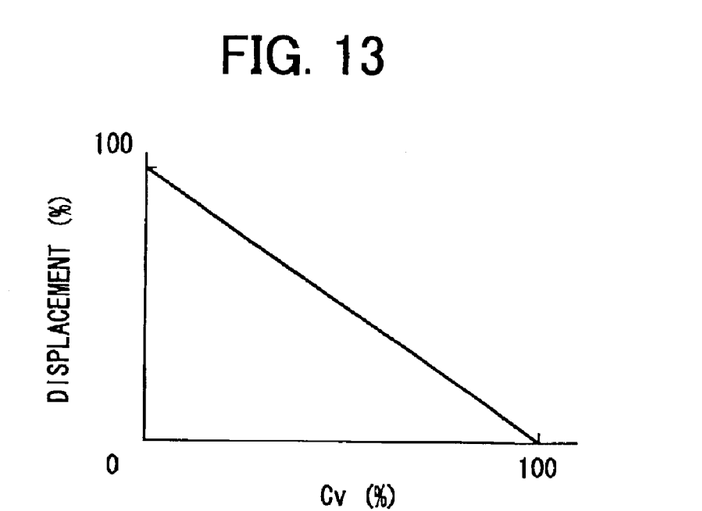
FIG. 13 is a graph showing a relationship between the displacement of the compressor and the current value Cv, according to a modification of the present invention.
Figure 14:
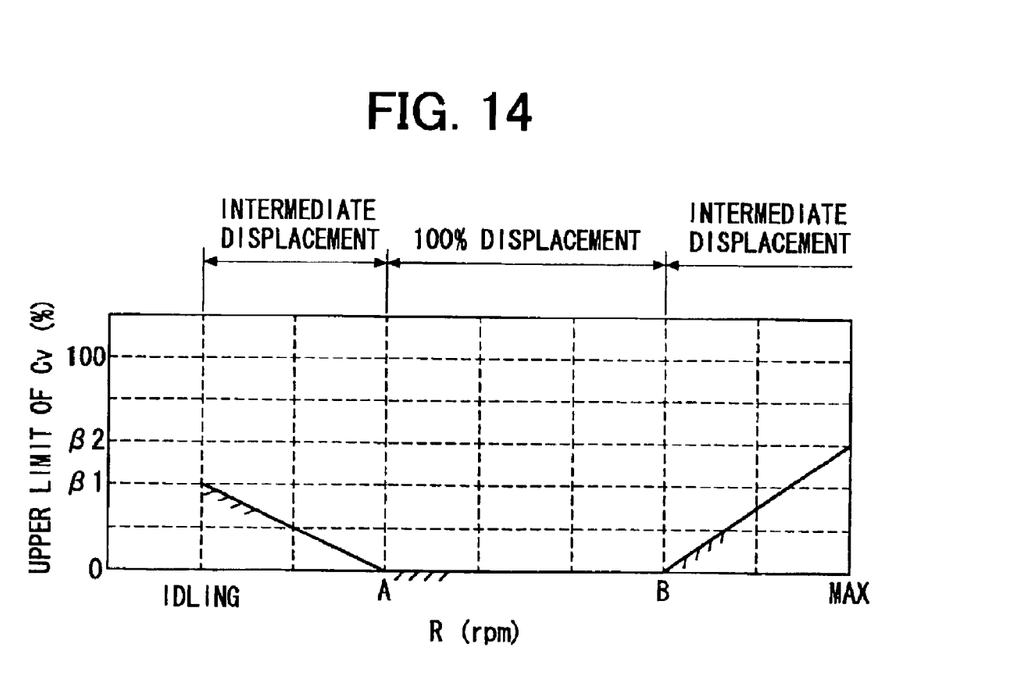
FIG. 14 is a graph showing a relationship between the upper limit of the current value Cv and the rotational speed R of the vehicle engine, according to a sixth embodiment of the present invention.

For example, in the above-described first to fourth embodiments, as shown in FIG. 4A, as the current value Cv increases, the displacement of the compressor 100 is set to be increased. However, as shown in FIG. 13, as the current value Cv increases, the displacement of the compressor 100 can be set to be reduced. In this case, as shown in FIG. 14, a lower limit of the current value Cv is controlled between a first variable minimum value $\beta 1$ (%) and a minimum value 0 (%) in the engine rotational speed range equal to or lower than the first predetermined rotational speed A. In the engine rotational speed range equal to or higher than the second predetermined rotational speed B, the lower limit of the current value Cv is controlled between a second variable minimum value β2 (%) and a minimum value 0 (%). Even in this case, the displacement of the compressor 100 can be variably controlled in accordance with the current value Cv. Further, similarly to the above-described upper limit of the current value, the lower limit can be changed stepwise or can be set at a constant value, as the rotational speed R of the engine 1 changes.

Further, the compressor 100 is not limited to the swash-plate displacement-variable compressor. For example, the present invention can be applied to a compressor having a bypass passage bypassing its compression chamber and its suction chamber, and a control valve for opening and closing the bypass passage. In this case, an open degree of the control valve is controlled by the control unit 300, so that the displacement of the compressor 100 can be controlled.

Such changes and modifications are to be understood as being within the scope of the present invention as defined by the appended claims.

What is claimed is:

1. A compressor device comprising:
   a compressor for compressing refrigerant in a refrigerant cycle system by using motive power from a vehicle engine, the compressor being provided with a displacement changing mechanism for changing displacement of the compressor per rotation thereof; and
   a control unit for changing a current value supplied to the displacement changing mechanism in accordance with a thermal load of the refrigerant cycle system, and for relatively changing the displacement of the compressor by changing the current value, wherein:
   the control unit changes the displacement such that the displacement of the compressor is increased by increasing the current value toward a maximum current value; and
   the control unit controls an upper limit of the current value between the maximum current value and a first predetermined value that is set smaller than the maximum current value, when a rotational speed of the vehicle engine is lower than a first predetermined rotational speed.

2. The compressor device according to claim 1, wherein the upper limit of the current value is increased from the first predetermined value to the maximum current value as the rotational speed of the vehicle engine increases from a minimum rotational speed to the first predetermined rotational speed.

3. The compressor device according to claim 1, wherein the control unit controls the upper limit of the current value between the maximum current value and a second predetermined value that is set smaller than the maximum current value, when the rotational speed of the vehicle engine is higher than a second predetermined rotational speed that is higher than the first predetermined rotational speed.

4. The compressor device according to claim 3, wherein the upper limit of the current value is reduced from the maximum current value to the second predetermined value as the rotational speed of the vehicle engine increases from the second predetermined rotational speed to the maximum rotational speed.

5. The compressor device according to claim 3, wherein the upper limit of the current value is set at the maximum current value when the rotational speed of the vehicle engine is in a range between the first predetermined rotational speed and the second predetermined rotational speed.

6. The compressor device according to claim 2, wherein the upper limit of the current value is increased stepwise as the rotational speed of the vehicle engine increases from the minimum rotational speed to the first predetermined rotational speed.

7. The compressor device according to claim 3, wherein:
   the upper limit of the current value is decreased stepwise as the rotational speed of the vehicle engine increases from the second predetermined rotational speed to the maximum rotational speed.

8. The compressor device according to claim 1, wherein:
   the control unit sets the upper limit of the current value at the first predetermined value, when the rotational speed of the vehicle engine is in a range between a minimum rotational speed and the first predetermined rotational speed.

9. The compressor device according to claim 1, wherein:
   the compressor is a swash-plate displacement-variable compressor including:
   a shaft,
   a pressure control chamber,
   a swash plate provided in the pressure control chamber;
   a piston connected to the swash plate, a stroke of the piston being changed in accordance with a slant angle of the swash plate with respect to the shaft, and
   a pressure control valve for changing a refrigerant pressure in the pressure control chamber by changing an open degree thereof in accordance with the current value supplied from the control unit, and for changing the slant angle of the swash plate by adjusting the refrigerant pressure in the pressure control chamber; and
   the displacement changing mechanism is constructed of the swash plate and the pressure control valve.

10. The compressor device according to claim 9, wherein the pressure control valve is controlled based on the current value supplied to the pressure control valve and a pressure difference at least between two different positions at a discharge side of the compressor.

11. A compressor device comprising:
   a compressor for compressing refrigerant in a refrigerant cycle system by using motive power from a vehicle engine, the compressor being provided with a displacement changing mechanism for changing displacement of the compressor per rotation thereof; and
   a control unit for changing a current value supplied to the displacement changing mechanism in accordance with a thermal load of the refrigerant cycle system, and for relatively changing the displacement of the compressor by changing the current value, wherein:
   the control unit changes the displacement such that the displacement of the compressor is increased by decreasing the current value toward a minimum current value; and
   the control unit controls a lower limit of the current value between the minimum current value and a first predetermined value that is set larger than the minimum current value, when the rotational speed of the vehicle engine is lower than the first predetermined rotational speed.

12. The compressor device according to claim 11, wherein:
   the lower limit of the current value is decreased from the first predetermined value to the minimum value as the rotational speed of the vehicle engine increases from a minimum rotational speed to the first predetermined rotational speed.

13. The compressor device according to claim 11, wherein the control unit controls the lower limit of the current value between the minimum current value and a second predetermined current value that is set larger than the minimum current value, when the rotational speed of the vehicle engine is higher than a second predetermined rotational speed that is higher than the first predetermined rotational speed.

14. The compressor device according to claim 13, wherein the lower limit is increased from the minimum current value to the second predetermined value as the rotational speed of the vehicle engine increases from the second predetermined rotational speed to the maximum rotational speed.

15. The compressor device according to claim 13, wherein the lower limit of the current value is set at the minimum current value when the rotational speed of the vehicle engine is in the range between the first predetermined rotational speed and the second predetermined rotational speed.

16. The compressor device according to claim 12, wherein the lower limit of the current value is reduced stepwise as the rotational speed of the vehicle engine increases from the minimum rotational speed to the first predetermined rotational speed.

17. The compressor device according to claim 13, wherein the lower limit of the current value is increased stepwise as the rotational speed of the vehicle engine increases from the second predetermined rotational speed to the maximum rotational speed.

18. The compressor device according to claim 11, wherein:
the control unit sets the lower limit of the current value at the second predetermined value.

19. The compressor device according to claim 10, wherein:
the compressor is a swash-plate displacement-variable compressor including:
a shaft,
a pressure control chamber,
a swash plate provided in the pressure control chamber;
a piston connected to the swash plate, a stroke of the piston being changed in accordance with a slant angle of the swash plate with respect to the shaft, and
a pressure control valve for changing a refrigerant pressure in the pressure control chamber by changing an open degree thereof in accordance with the current value supplied from the control unit, and for changing the slant angle of the swash plate by adjusting the refrigerant pressure in the pressure control chamber; and
the displacement changing mechanism is constructed of the swash plate and the pressure control valve.

20. The compressor device according to claim 18, wherein the pressure control valve is controlled based on the current value supplied to the pressure control valve and a pressure difference at least between two different positions at a discharge side of the compressor.

21. A control method of controlling a compressor for compressing refrigerant in a refrigerant cycle system by using motive power from a vehicle engine, the compressor including a displacement changing mechanism for changing displacement of the compressor per rotation thereof, the control method comprising:
controlling a current value supplied to the displacement changing mechanism in accordance with a thermal load of the refrigerant cycle system; and
relatively changing the displacement of the compressor by the controlled current value, based on a first control where the displacement of the compressor is increased by increasing the current value toward the maximum current value, or a second control where the displacement of the compressor is increased by decreasing the current value toward a minimum current value, wherein:
in the first control, an upper limit of the current value is controlled between the maximum current value and a first predetermined value that is set smaller than the maximum current value when a rotational speed of the vehicle engine is lower than a first predetermined rotational speed; and
in the second control, a lower limit of the current value is controlled between the minimum current value and a second predetermined value that is set larger than the minimum current value when the rotational speed of the vehicle engine is lower than the first predetermined rotational speed.

22. The control method according to claim 21, wherein:
in the first control, the upper limit of the current value is controlled between the maximum current value and a third predetermined value that is set smaller than the maximum current value when the rotational speed of the vehicle engine is higher than a second predetermined rotational speed that is higher than the first predetermined rotational speed; and
in the second control, the lower limit of the current value is controlled between the minimum current value and a fourth predetermined value that is set larger than the minimum current value when the rotational speed of the vehicle engine is higher than the second rotational speed.

23. The control method according to claim 21, wherein:
in the first control, the upper limit of the current value is set at the first predetermined value; and
in the second control, the lower limit of the current value is set at the second predetermined value.

* * * * *